(12) United States Patent
Ben-Shachar et al.

(10) Patent No.: US 6,557,004 B1
(45) Date of Patent: Apr. 29, 2003

(54) METHOD AND APPARATUS FOR FAST SEARCHING OF HAND-HELD CONTACTS LISTS

(75) Inventors: Ido Ben-Shachar, Redmond, WA (US); Chee H. Chew, Redmond, WA (US); Kevin T. Shields, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/562,689

(22) Filed: May 2, 2000

Related U.S. Application Data

(60) Provisional application No. 60/175,115, filed on Jan. 6, 2000.

(51) Int. Cl.[7] ............................................. G06F 17/30
(52) U.S. Cl. ................................. 707/102; 707/3; 707/7
(58) Field of Search ................................ 707/3, 7, 102

(56) References Cited

U.S. PATENT DOCUMENTS

| | | | | |
|---|---|---|---|---|
| 6,094,649 A | * | 7/2000 | Bowen et al. | 707/3 |
| 6,202,062 B1 | * | 3/2001 | Cameron et al. | 707/3 |
| 6,233,583 B1 | * | 5/2001 | Hoth | 707/102 |
| 6,256,627 B1 | * | 7/2001 | Beattie et al. | 707/6 |
| 6,269,369 B1 | * | 7/2001 | Robertson | 707/10 |
| 6,278,453 B1 | * | 8/2001 | Bodnar | 345/339 |
| 6,278,992 B1 | * | 8/2001 | Curtis et al. | 707/3 |
| 6,341,316 B1 | * | 1/2002 | Kloba et al. | 709/248 |
| 6,370,518 B1 | * | 4/2002 | Payne et al. | 707/1 |
| 6,404,884 B1 | * | 6/2002 | Marwell et al. | 379/265.13 |
| 6,473,751 B1 | * | 10/2002 | Nikolovska et al. | 707/3 |

* cited by examiner

Primary Examiner—John Breene
Assistant Examiner—Cheryl Lewis
(74) Attorney, Agent, or Firm—Theodore M. Magee; Westman, Champlin & Kelly, P.A.

(57) ABSTRACT

The present invention provides a quick searching method for filtering a contact list in a hand-held device. Under the method, upon receiving a search string from a user, a database object is opened that is sorted alphabetically on the first name of each contact. A search is then performed on the sorted list to retrieve the ID's of the first record in the sorted list and the last record in the sorted list that have a first name that matches the search string. A second database object is then opened that is sorted alphabetically on a "filed as" field. The "filed as" list is then searched to find the first and last records that match the search string. The first name search results and the "filed as" search results are then combined. The records in the combination are then displayed to the user.

26 Claims, 6 Drawing Sheets

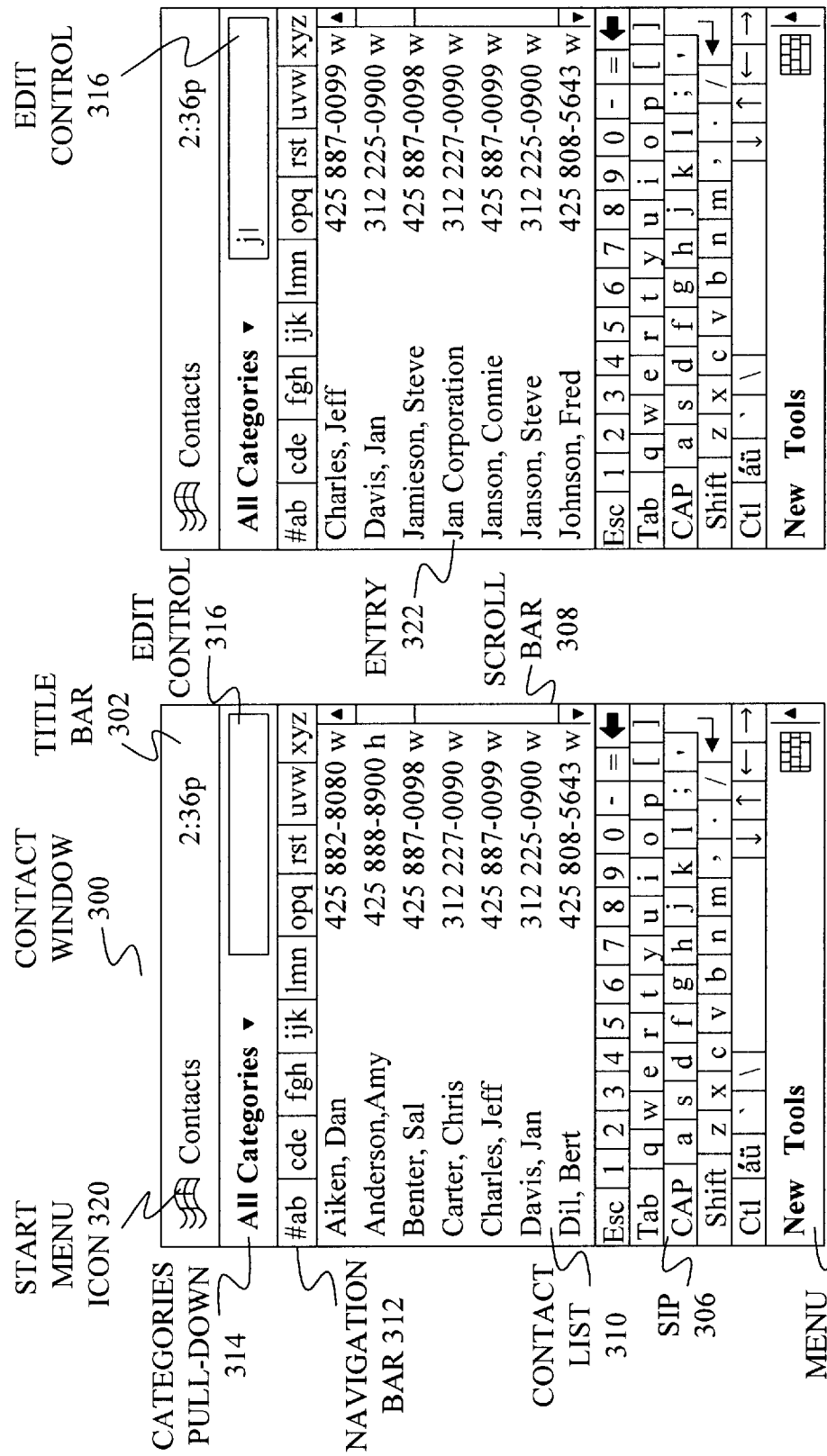

FIG. 5

EDIT CONTROL 316

Contacts     2:36p

All Categories ▼    janl

| #ab | cde | fgh | ijk | lmn | opq | rst | uvw | xyz |

Davis, Jan       312 225-0900 w
Jan Corporation   312 227-0090 w
Janson, Connie    425 887-0099 w
Janson, Steve     312 225-0900 w

ENTRY 322

| Esc | 1 | 2 | 3 | 4 | 5 | 6 | 7 | 8 | 9 | 0 | - | = | [ ] |
| Tab | q | w | e | r | t | y | u | i | o | p |   |   |   |
| CAP | a | s | d | f | g | h | j | k | l | ; | ' |   |   |
| Shift | z | x | c | v | b | n | m | , | . | / |   |   |   |
| Ctl | áü | ` | \ |   |   |   |   | ↑ | ← | ↓ | → |   |   |

New    Tools

METHOD AND APPARATUS FOR FAST SEARCHING OF HAND-HELD CONTACTS LISTS

REFERENCE TO RELATED APPLICATIONS

The present application claims priority from a U.S. Provisional application having serial No. 60/175,115, filed on Jan. 6, 2000 pending, and entitled "METHOD AND APPARATUS FOR FAST SEARCHING OF HAND-HELD CONTACTS LISTS".

Reference is hereby made to the following co-pending U.S. patent applications, which are all assigned to the same assignee as the present application: "SMART COLUMN FOR CONTACT INFORMATION ON PALM-SIZED COMPUTING DEVICES AND METHOD AND APPARATUS FOR DISPLAYING THE SAME", having Ser. No. 09/564,515 and filed on May 5, 2000 pending; "USER INTERFACE FOR PALM-SIZED COMPUTING DEVICES AND METHOD AND APPARATUS FOR DISPLAYING THE SAME", having Ser. No. 09/564,928 and filed on May 4, 2000 pending; "METHOD AND APPARATUS FOR PROVIDING CONTEXT MENUS ON A PEN-BASED DEVICE", having Ser. No. 09/559,694 and filed on Apr. 27, 2000 pending; and "METHOD AND APPARATUS FOR PROVIDING RECENT CATEGORIES ON A HAND-HELD DEVICE", having Ser. No. 09/559,695 and filed on Apr. 27, 2000 pending.

BACKGROUND OF THE INVENTION

The present invention relates to hand-held electronic devices. In particular, the present invention relates to searching contacts lists in hand-held devices.

On palm-sized devices, such as phones and hand-held computing devices, especially ones with slow keyboards and limited sized screens, finding a contact entry in a list of thousands of entries can be difficult.

Under the prior art, a user can search for a desired contact by scrolling through the list using either a scrollbar or up/down keys to navigate. The up/down keys provide fine granularity control, allowing the user to move through the list one record at a time. However, scrolling through an entire list of contacts using these keys takes too long and is disorienting. The scroll bar, on the other hand, allows the user to move quickly through the list. However, the coarse granularity of the scrollbar often causes the user to flip-flop from too far past the contact to too far before the contact.

In either case, the user is required to do too much thinking while they're scrolling. Specifically, the user must continually alphabetize their contact relative to the currently displayed list to see whether they should scroll forward or backward. Worse, if the user is looking for a particular first name, their search becomes even more complicated since the contacts in hand-held devices are sorted by last name.

To alleviate these searching problems, some hand-held devices of the prior art allow users to enter a search query into the hand-held device. The device then searches for contact entries that match the query. In some systems, this search is only performed on a single field, making it difficult to locate matches in other fields. Some systems allowed the user to "jump" through the contact list by entering a single character. Thus, by entering "C" the user could jump to the first entry that had a last name starting with "C." Such systems only searched one field of the database. In addition, such systems did not filter the search results but simply displayed the portion of the contact list that followed the found entry in the database. As such, these systems usually displayed additional records that did not start with the search letter.

In other systems, the entire contact record is searched. However, full record searching takes a great deal of time because it requires the decompression of each full record in memory. In addition, because the records are sorted on only a single field during a full record search, every record in the database must be searched. This means that as the number of contacts in the list increases, the amount of time needed to search the list increases proportionally. For example, if the number of contacts doubles, the search time for full record searching doubles. Because of this, under some prior art systems, a user with over a thousand contacts would have to wait over 5 seconds to get the results of their search.

SUMMARY OF THE INVENTION

The present invention provides a quick searching method for filtering a contact list in a hand-held device. Under the method, upon receiving a search string from a user, a database object is opened that is sorted alphabetically on the first name of each contact. A search is then performed on the sorted list to retrieve the ID's of the first record in the sorted list and the last record in the sorted list that have a first name that matches the search string. A second database object is then opened that is sorted alphabetically on a "filed as" field. The "filed as" list is then searched to find the first and last records that match the search string. The first name search results and the "filed as" search results are then combined. The records in the combination are then displayed to the user.

Under one embodiment of the invention, the scalability of the searching method is improved by utilizing binary searches or n-ary searches when searching the databases sorted on first and last names.

BRIEF DESCRIPTION OF THE DRAWINGS

FIG. 3 is a screen shot of a display showing a contacts list.

FIG. 4 is a screen shot of a display showing a contacts list returned in response to a search performed under the present invention.

FIG. 5 is a screen shot of a display showing a refined contacts list returned in response to additional characters in the search string under one embodiment of the present invention.

DETAILED DESCRIPTION OF ILLUSTRATIVE EMBODIMENTS

Figure 1:
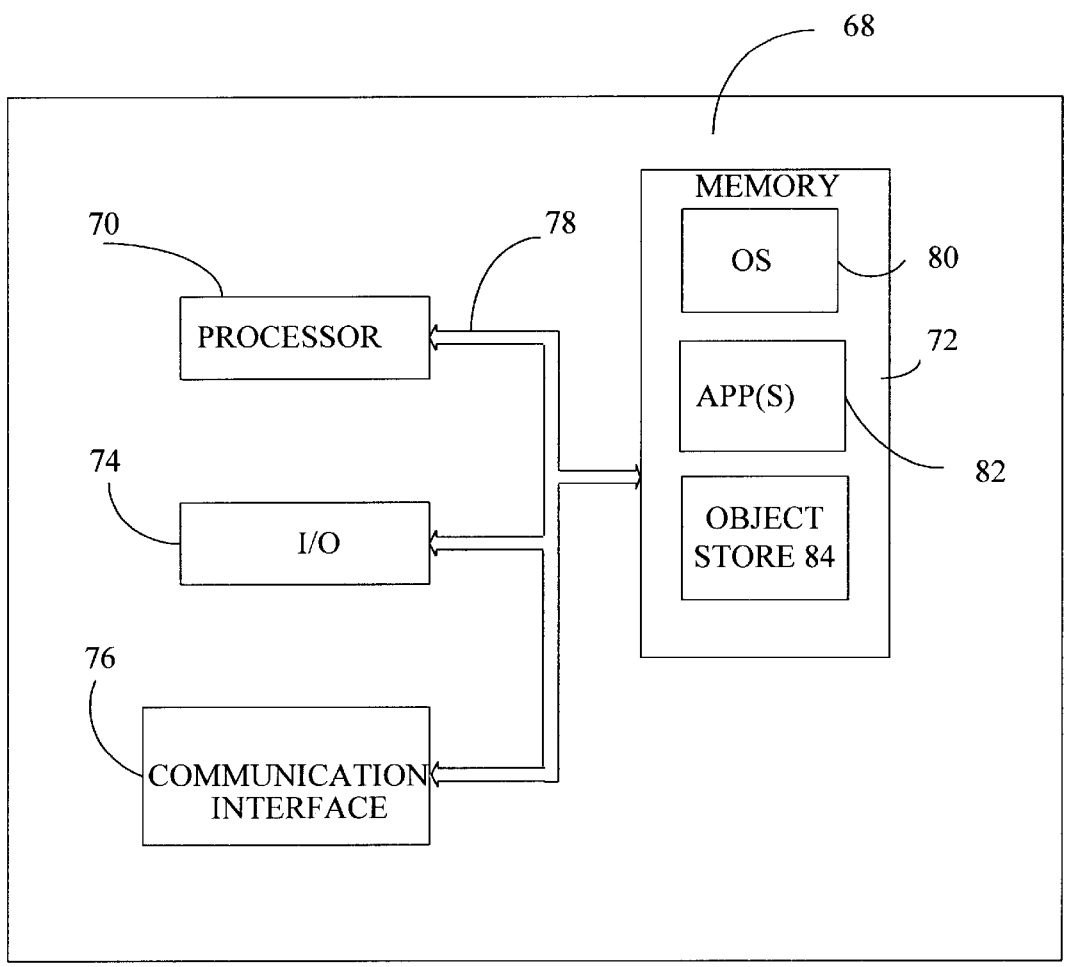
FIG. 1 is a block diagram of a mobile computing environment in which many embodiments of the present invention may be practiced.

FIG. 1 is a block diagram of a mobile device 68, which is an exemplary computing environment. Mobile device 68 includes a microprocessor 70, memory 72, input/output (I/O) components 74, and a communication interface 76 for communicating with remote computers or other mobile devices. In one embodiment, the aforementioned components are coupled for communication with one another over a suitable bus 78.

Memory 72 is implemented as non-volatile electronic memory such as random access memory (RAM) with a battery back-up module (not shown) such that information stored in memory 72 is not lost when the general power to mobile device 68 is shut down. A portion of memory 72 is preferably allocated as addressable memory for program execution, while another portion of memory 72 is preferably used for storage, such as to simulate storage on a disk drive.

Memory 72 includes an operating system 80, application programs 82 as well as an object store 84. During operation, operating system 80 is preferably executed by processor 70 from memory 72. Operating system 80, in one preferred embodiment, is a "WINDOWS® CE" brand operating system commercially available from Microsoft Corporation. Operating system 80 is preferably designed for mobile devices, and implements database features that can be utilized by applications 82 through a set of exposed application programming interfaces and methods. The objects in object store 84 are maintained by applications 82 and operating system 80, at least partially in response to calls to the exposed application programming interfaces and methods.

Communication interface 76 represents numerous devices and technologies that allow mobile device 68 to send and receive information. The devices include wired and wireless modems, satellite receivers and broadcast tuners to name a few. Mobile device 68 can also be directly connected to a computer to exchange data therewith. In such cases, communication interface 76 can be an infrared transceiver or a serial or parallel communication connection, all of which are capable of transmitting streaming information.

Figure 2:
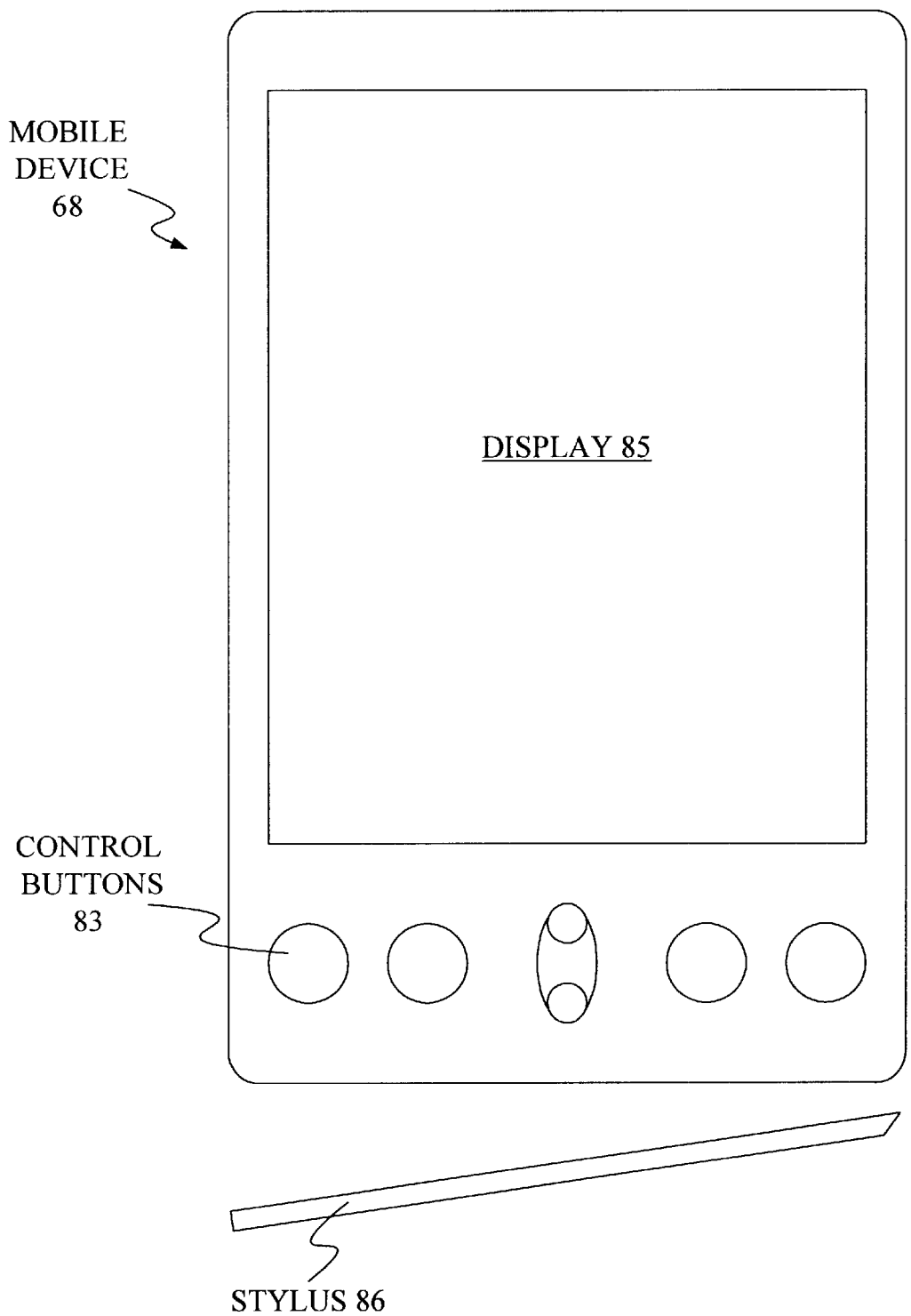
FIG. 2 is a front view of a mobile computing device on which many embodiments of the present invention may be practiced.

FIG. 2 is a simplified pictorial illustration of mobile device 68. Mobile device 68 can be a desktop assistant sold under the designation H/PC or a palm-sized PC designated as P/PC having software provided by the Microsoft Corporation, for example. In one embodiment, mobile device 68 includes a set of control buttons 83, display 85 and stylus 86. In the embodiment shown in FIG. 2, display 85 is a liquid crystal display (LCD) which uses a contact sensitive display screen in conjunction with stylus 86. Stylus 86 is used to press or contact display 85 at designated coordinates to accomplish certain user input functions. In some embodiments, a miniaturized keyboard with alpha-numeric keys is provided with the mobile device. In other known embodiments, a "soft" keyboard, known as a Soft Input Panel (SIP), is provided through the contact sensitive display screen. In yet other embodiments, a character recognition module is employed to recognize characters written on the contact sensitive display screen using stylus 86.

FIG. 3 provides an example of a contact window 300 that is shown on display 85 of FIG. 2 under some embodiments of the present invention. Contact window 300 includes a title bar 302 that indicates that this is the Contacts window and that provides a start menu icon 320. Window 300 also provides a menu bar 304, a soft input panel (SIP) 306, scroll bar 308, contact list 310, alphabetical contact navigation bar 312, Categories pull-down label 314 and edit control 316. By tapping the stylus on the letters of soft input panel 306, the user is able to insert letters in edit control 316.

As the user enters letters into edit control 316, a quick searching algorithm of the present invention begins to search a database of contacts. With each new letter, the algorithm updates contact list 310 so that it only contains records that have a first name or last name that match the current string in edit control 316. For example, in FIG. 4, the user has tapped the letter j in soft input panel 306 causing the character "j" to appear in edit control 316. Based on this input, the searching algorithm has updated contact list 310 so that it only displays contacts whose first or last name begin with "J". In FIG. 5, the list of contacts is shortened further based on the user typing "jan" in edit control 316.

Note that entry 322 of FIGS. 4 and 5 contains a corporate name instead of a first or last name. As described below, the present invention searches a "filed as" field to generate the search results. This "filed as" field contains the last name and the first name if the record has a first and last name, the last name if the record has an entry in the last name but not the first name, the first name if the record has an entry in the first name field but not the last name field, and the corporate name if the record does not have an entry in the first or last name fields.

Figure 6:
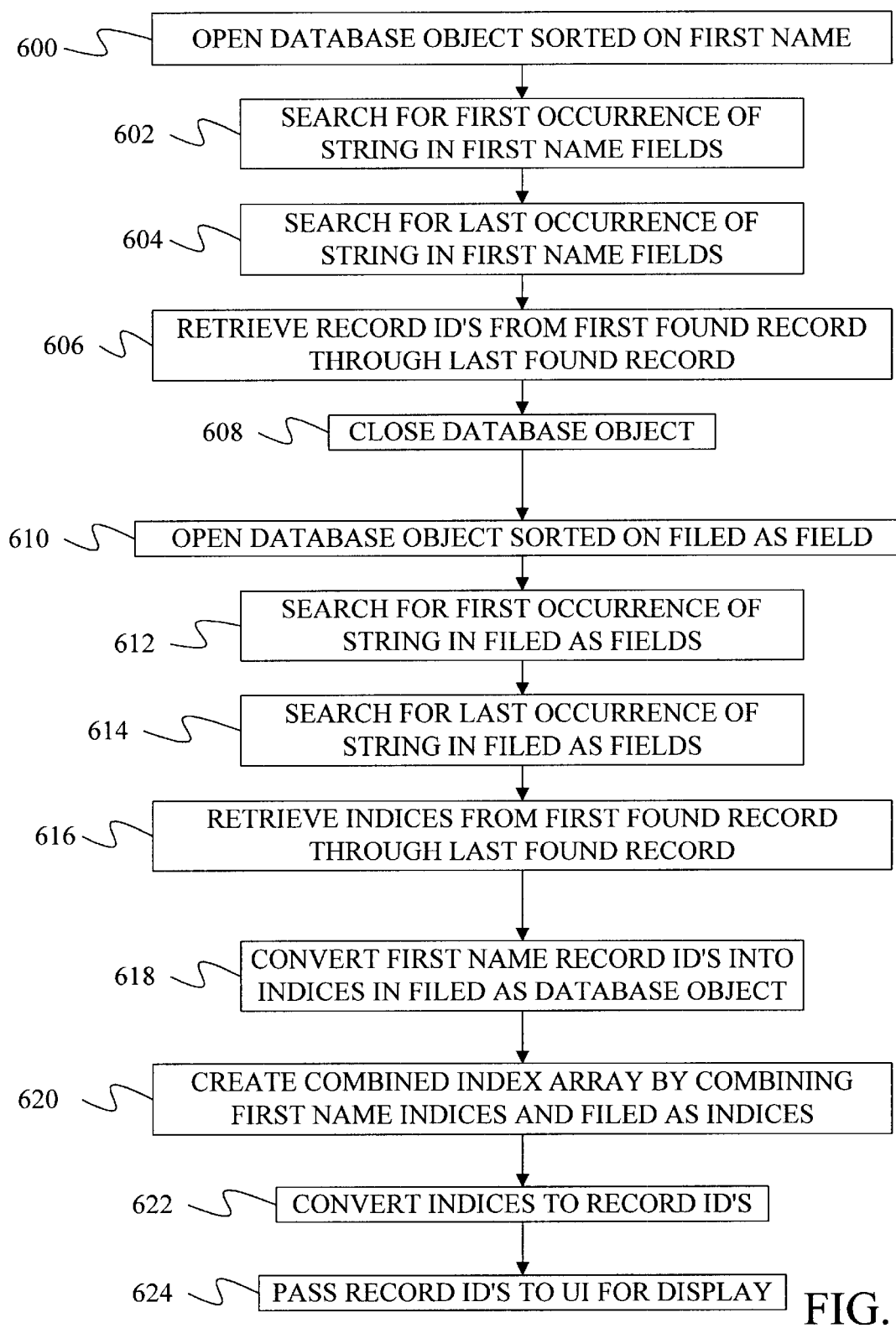
FIG. 6 is a flow diagram of a method of displaying a user interface under one embodiment of the present invention.

FIG. 6 provides a flow diagram of a method for searching for contacts under the present invention. In the discussion below, reference is made to the software objects and applications found in the block diagram of FIG. 7.

Figure 7:
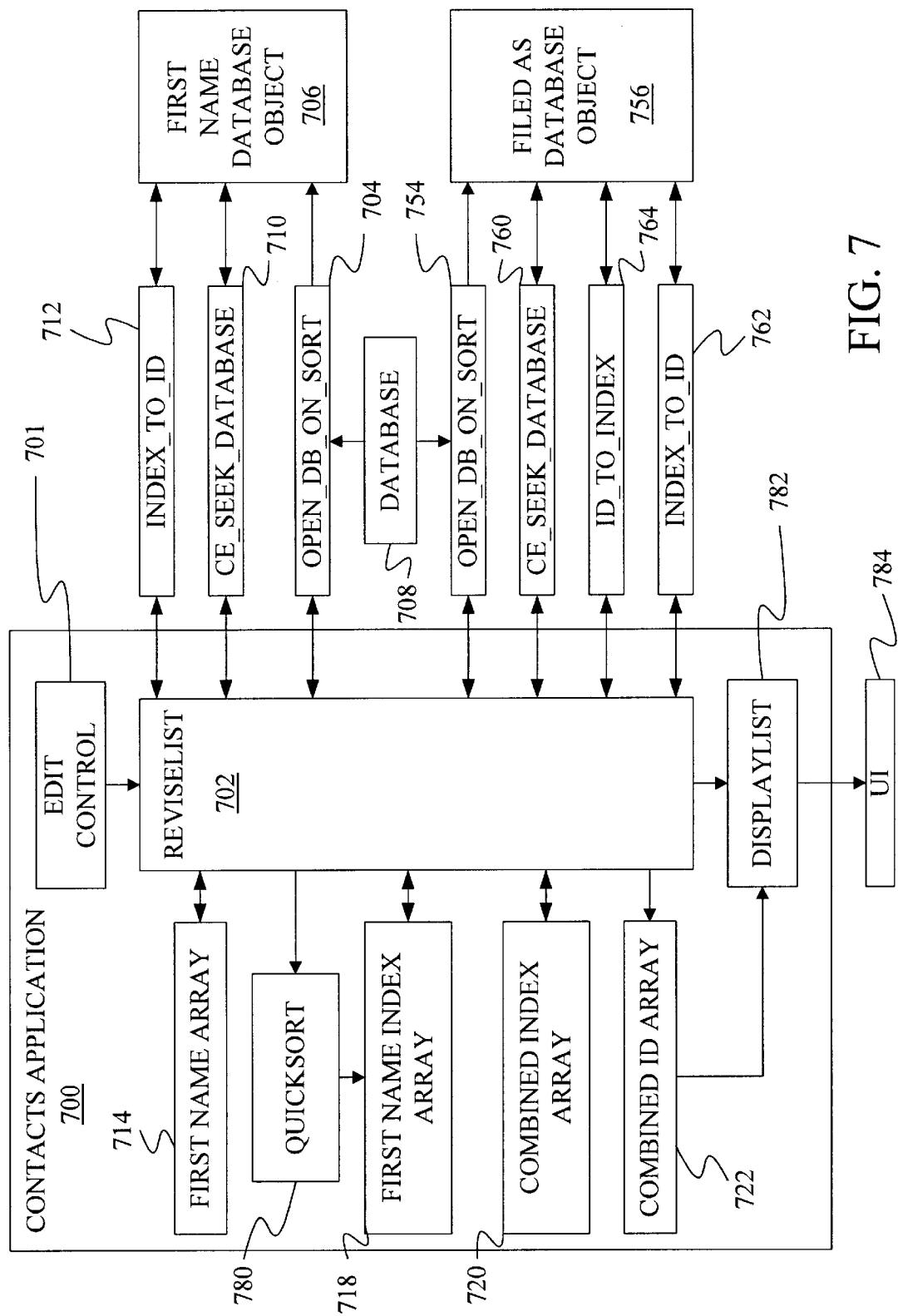
FIG. 7 is a block diagram of software components found in one embodiment of the present invention.

Upon receiving a change to its display field, either the addition of a letter or the removal of a letter, edit control 701 of FIG. 7 makes a call to ReviseList function 702. In the call, edit control 701 passes the current state of the string in its display field.

When it is called, ReviseList 702 makes a call to an OpenDBOnSort API 704 to open a database object 706 from contacts stored in contacts database 708. Database object 706 is selected based on a field designated by ReviseList 702 and is a pre-sorted object that has been sorted based on the first name field of each record.

Database object 706 can take many forms. In one embodiment, database object 706 is a linked list, with each entry in the list pointing to the next entry in the list. In other embodiments, database object 706 is a tree structure such as a binary tree or a balanced tree (B tree). Each entry in database object 706 may contain a full record set, where each field present in database 708 is present in the object, or may contain a reduced set of fields.

Database object 706 usually contains at least the first name and record ID of each record in database 708. In addition, each record in database object 706 is assigned an index based on its position within database object 706.

After database object 706 has been created, ReviseList 702 calls CeSeekDatabase 710, which searches database object 706 for the first record that contains the search string in its first name field. This is shown as search step 602 in FIG. 6. In most embodiments, this search is performed using a binary or n-ary searching technique. In both binary searches and n-ary searches, the sorted list of contacts is repeatedly divided into smaller segments by comparing the search string to one or more keys. At each decision node, a segmented is selected that will contain the search string if it is present in the list. The selected segment is then further divided into smaller segments. This process is repeated until an individual record is reached.

The searching technique that is selected depends in part on the data structure of database object 706. For example, if database object 706 is a binary tree, a binary search is preferred. If database object 706 is a b tree, an n-ary search is performed. Embodiments of the present invention that use binary searching or n-ary searching scale well with large lists of contacts because they do not require that every record be accessed during the search.

In most embodiments, CeSeekDatabase( ) returns the index of the first record in database object 706 that matches the search string or, if no records match, CeSeekDatabase( ) returns the index of the first record in database object 706 that is alphabetically after the search string. For example, if the search string is "D" and no records begin with "D" but a records does begin with "E", CeSeekDatabase will return the record that begins with "E"

When the first matching record is found, its index is returned to ReviseList 702. ReviseList 702 then calls CeSeekDatabase 710 to search for the last record with a first name field entry that begins with the search string. This is shown as step 604 in FIG. 6. In one embodiment, this is accomplished by appending a string of "z" characters to the end of the search string provided by the user and passing the modified string to CeSeekDatabase 710. For instance, to find the last contact that starts with the string "ja", some embodiments of the present invention append the suffix "ZZZZZZZ" to the search string to produce the function call CeSeekDatabase("jaZZZZZZZ"). The result of this search is the index of the first contact that comes after "jaZZZZZZZ". In further embodiments, this contact is tested to ensure that its first name field does not begin with the search string. If it does begin with the search string, the next record in database object 706 is accessed to see if it matches the search string. This sequential movement through the database continues until a record is found that does not match the string.

In other embodiments, the last matching record is found by sequentially reading each record after the first found record in database object 706 until a record is found that does not match the search string.

Using the indices of the first and last records that match the string, ReviseList 702 then retrieves the record ID's for each record between the first and last matching records. This is accomplished by repeatedly calling IndexToID API 712 as shown in step 606 in FIG. 6. The retrieved ID's are then stored in a first name array 714. Database object 706 is then closed at step 608 of FIG. 6.

ReviseList 702 then calls a new instance of OpenDBOnSort 754 to open a new database object 756 that is pre-sorted on a "filed as" field. In this context, a "filed as" field contains the contents of the last name field and/or the first name field or the company name field. Specifically, the filed as field contains the last name and the first name if the record has a value in the last name field and the first name field. If there is no first name in the record but there is a last name, the filed as field contains the last name. If there is no last name in the record but there is a first name in the record, the filed as field contains the first name. If there is no first name or last name, the filed as field contains the company name. The step of opening database object 756 is shown as step 610 in FIG. 6.

Database object 756 is then searched to find the first and last records with "filed as" fields that match the search string. This is shown as steps 614 and 616 and involves calls to a new instance of CeSeekDatabase 760 to search database object 756. Like the first name searching discussed above, the filed as searches performed by CeSeekDatabase 760 may include binary searches or n-ary searches depending on the structure of database object 756. A starting index and an ending index are returned by these searches and represent the first and last records, respectively, in database object 756 that have filed as fields that begin with the search string.

At this point, the method has determined the record ID's of records that have first names that match the search string. These record ID's are stored in first name array 714. The method has also determined the starting and ending indices for records that have filed as entries that match the search string. Before these two sets of records can be combined, they must be designated in the same manner. This is accomplished at step 618 by converting the record ID's stored in first name array 714 into their respective indices as found in filed as database object 756. By making this conversion, all of the records that match the search query will be referenced by the indices found in database object 756.

To make this conversion, the present invention makes repeated calls to IDToIndex API 764, which uses database object 756 opened on the "filed as" field to convert the record ID's into indices. The returned indices represent the position of the records in database object 756 and are stored in first name index array 718.

Once the record ID's have been converted into indices, the indices for the first name records and the indices for the filed as records must be combined. To simplify the process of combining these two sets of indices, the indices in first name index array 718 are sorted by a Quicksort function 780 based on the index values.

The sorted indices in first name array 718 are then combined with the indices from the filed as search to form a combined index array 720. This is shown as step 620 in FIG. 6. In one method of combination, all of the indices of sorted array 718 that are less than the starting index returned by the "filed as" search are inserted into the top of array 720. Each index between the starting index and the ending index returned by the "filed as" search are then inserted into array 720. Lastly, all of the indices of array 718 that are greater than the ending index of the "filed as" search are inserted into array 720.

In other embodiments, the indices from the "filed as" search are simply appended to first name array 718. The combined list is then sorted using Quicksort. After sorting, duplicates are removed by passing through the sorted list and comparing the current record to the next record. The results are then stored as array 720.

The indices in array 720 are then converted into record ID's at step 622. This involves making repeated calls to IndexToID API 762, which locates the index values in "filed as" database object 756. The resulting record ID's are stored in an array 722. Array 722 is then passed to a DisplayList function 782, which displays the appropriate portions of the records identified in array 722 in a user interface 784. For example, the first name, last name and telephone number may be displayed as shown in FIG. 4.

In most embodiments, the steps of FIG. 6 are repeated each time there is a change in the contents of the edit control box. Under most of these embodiments, the database objects used for searching are regenerated directly from the database each time the edit control box input changes. Thus, the database objects used for searching include each record in the full database regardless of the number of records currently being displayed.

In other embodiments, the system sets a timer each time the user enters a new character into the edit control box. The system then waits for the timer to expire before executing the steps of FIG. 6.

Although the present invention has been described with reference to searching two database fields, more than two fields may be searched within the scope of the present invention. This would involve combining more than two results lists. For example, under the present invention, a first name field, a last name field, and a company field may be searched using the techniques described above.

Although the present invention has been described with reference to particular embodiments, workers skilled in the art will recognize that changes may be made in form and detail without departing from the spirit and scope of the invention. In particular, although the present invention has been described with reference to a hand-held computing device, it may be practiced in other electronic devices such as phones. In such electronic devices, the instructions for performing the present invention are typically stored on a storage medium such as a memory chip.

What is claimed is:

1. A method of generating a user interface on a hand-held device, the method comprising:

receiving a search string from the user;

generating a first database object from a database containing contacts records, each record comprising a first field and a second field, the first database object being sorted on the first field;

searching for the search string in the first database object and retrieving search-based record ID's for records with first field entries that begin with the search string;

generating a second database object that is sorted on the second field;

searching for the search string in the second database object and retrieving search-based record indices for records with second field entries that begin with the search string;

combining the search-based record ID's with the search-based record indices to produce a full list of indices; and displaying at least one field of at least one record identified by the full list of indices.

2. The method of claim 1 wherein generating a first database object comprises opening a b-tree.

3. The method of claim 2 wherein searching for the search string in the first database object comprises performing an n-ary search using the b-tree structure of the first database object.

4. The method of claim 1 wherein searching for the search string in the first database object comprises performing a binary search.

5. The method of claim 1 wherein generating a second database object comprises opening a b-tree.

6. The method of claim 5 wherein searching for the search string in the second database object comprises performing an n-ary search using the b-tree structure of the second database object.

7. The method of claim 1 wherein searching for the search string in the second database object comprises performing a binary search.

8. The method of claim 1 wherein combining the search-based record ID's with the search-based record indices comprises converting the search-based record ID's into conversion record indices by searching for the search-based record ID's in the second database object and retrieving conversion record indices for records with record ID entries that match the search-based record ID's.

9. The method of claim 8 wherein combining the search-based record ID's with the search-based record indices further comprises combining the conversion record indices with the search-based record indices through steps comprising:

sorting the conversion record indices;

identifying a starting search-based record index, the starting search-based record index being the lowest search-based record index;

identifying an ending search-based record index, the ending search-based record index being the highest search-based record index;

inserting conversion record indices that are less than the starting search-based record index into a full index list;

inserting the search-based record indices into the full index list; and inserting conversion record indices that are greater than the ending search-based record index into the full index list.

10. The method of claim 9 wherein combining the conversion record indices with the search-based record indices further comprises converting the full index list into a full ID list by converting the indices in the full index list into record ID's using the second database object.

11. The method of claim 10 wherein displaying at least one field of at least one record identified by the full list of indices comprises displaying at least one field of at least one record identified by a record ID in the full ID list.

12. The method of claim 1 wherein the first field is a first name field containing first names and the second field is a "filed as" field containing at least one of a first name, last name, or company name.

13. A storage medium for a hand-held electronic device, the storage medium having instructions for performing steps comprising:

generating contact records in a contacts database, each contact record containing a filed as field and a first name field;

receiving a search string;

searching the first name field for the search string in fewer than all of the records of the contacts database to produce a first name search result;

searching the filed as field for the search string in fewer than all of the records of the contacts database to produce a filed as search result;

combining the first name search result and the filed as search result to produce a full search result, the full search result comprising a reference to all records in the contacts database that have entries in either the first name field or the filed as field that begin with the search string; and displaying at least one field of at least one record identified in the full search result.

14. The storage medium of claim 13 wherein searching the first name field comprises generating a first data structure sorted on the first name field and searching for the search string in the first data structure.

15. The storage medium of claim 14 wherein the first data structure is a b-tree.

16. The storage medium of claim 15 wherein searching the first data structure comprises performing an n-ary search of the b-tree.

17. The storage medium of claim 14 wherein searching the first data structure comprises performing a binary search.

18. The storage medium of claim 14 wherein searching the first data structure comprises:

searching for a first record in the first data structure that has a first name entry that begins with the search string;

searching for the last record in the first data structure that has a first name entry that begins with the search string; and producing the first name search result from the records between the first record found by searching to the last record found by searching.

19. The storage medium of claim 18 wherein searching for the last record in the first data structure comprises appending a string of "z" characters to the end of the search string to produce a modified search string and searching for the modified search string in the first data structure.

20. The storage medium of claim 14 wherein searching the filed as field comprises generating a second data structure sorted on the filed as field and searching for the search string in the second data structure.

21. The storage medium of claim 20 wherein the second data structure is a b-tree.

22. The storage medium of claim 21 wherein searching the second data structure comprises performing an n-ary search of the b-tree.

23. The storage medium of claim 20 wherein searching the second data structure comprises performing a binary search.

24. The storage medium of claim 20 wherein the first name search result is a list of record ID's and the filed as search result is a list of indices designating record positions in the second data structure and wherein combining the first name search result and the filed as search result comprises:

converting the record ID's in the first name search result into indices designating the position of records in the second data structure; and combining the indices from the first name search result with the indices of the filed as search result.

25. The storage medium of claim 24 wherein combining the indices from the first name search result with the indices from the filed as search result comprises:

sorting the indices of the first name result to form a sorted first name index list;

inserting all indices of the sorted first name index list that are less than the lowest index of the filed as search result into a combined index array;

inserting all of the indices of the filed as search result into the combined index array; and inserting all indices of the sorted first name index list that are greater than the highest index of the filed as search result into the combined index array.

26. The storage medium of claim 25 wherein combining the indices from the first name search result with the indices of the filed as search result further comprises converting the indices of the combined index array into record ID's to produce the full search result.

* * * * *